(12) United States Patent
Guzik

(10) Patent No.: US 12,028,709 B2
(45) Date of Patent: Jul. 2, 2024

(54) REMOTE TRIGGERING OF EVENTS BY PERSONAL DEVICES

(71) Applicants: Getac Technology Corporation, Taipei (TW); WHP Workflow Solutions, Inc., North Charleston, SC (US)

(72) Inventor: Thomas Guzik, Edina, MN (US)

(73) Assignees: Getac Technology Corporation, Taipei (TW); WHP Workflow Solutions, Inc., North Charleston, SC (US)

(*) Notice: Subject to any disclaimer, the term of this patent is extended or adjusted under 35 U.S.C. 154(b) by 317 days.

(21) Appl. No.: 17/306,857

(22) Filed: May 3, 2021

(65) Prior Publication Data

US 2021/0345118 A1    Nov. 4, 2021

Related U.S. Application Data

(60) Provisional application No. 63/019,610, filed on May 4, 2020.

(51) Int. Cl.
  *H04W 12/08* (2021.01)
  *H04W 12/03* (2021.01)
  *H04W 12/0471* (2021.01)

(52) U.S. Cl.
  CPC .......... *H04W 12/08* (2013.01); *H04W 12/03* (2021.01); *H04W 12/0471* (2021.01)

(58) Field of Classification Search
  CPC .. H04W 12/08; H04W 12/03; H04W 12/0471
  See application file for complete search history.

(56) References Cited

U.S. PATENT DOCUMENTS

| | | | |
|---|---|---|---|
| 10,349,227 B2 * | 7/2019 | Saxena | H04W 4/023 |
| 11,551,441 B2 * | 1/2023 | Gurule | G06F 3/0484 |
| 2017/0094226 A1 * | 3/2017 | Guzik | H04W 4/029 |
| 2018/0158305 A1 * | 6/2018 | Noland | G08B 21/0438 |
| 2019/0020905 A1 * | 1/2019 | Bennett | H04N 5/917 |

* cited by examiner

*Primary Examiner* — Zachary A. Davis
(74) *Attorney, Agent, or Firm* — Finnegan, Henderson Farabow, Garrett & Dunner, L.L.P.

(57) ABSTRACT

A subscriber device may perform a key exchange with a network operation center (NOC) computing device to receive a secret key. A list of group identifiers of personal devices for which the subscriber device is to handle events may be received at the subscriber device. The subscriber device may receive an encrypted event packet from a personal device via a direct communication connection. The subscriber device may decrypt the encrypted event packet at the subscriber device using the secret key to generate a decrypted event packet and extract a group identifier from the decrypted event packet. In response to determining that the group identifier is included in the list of group identifiers received from the NOC computing device, an event handler of a plurality of handlers stored in the subscriber device that corresponds to an event included in the decrypted event packet may be identified to handle the event.

18 Claims, 6 Drawing Sheets

REMOTE TRIGGERING OF EVENTS BY PERSONAL DEVICES

CROSS-REFERENCE TO RELATED PATENT APPLICATION

This application claims priority to U.S. Provisional Patent Application No. 63/019,610, filed on May 4, 2020, entitled "Remote Triggering of Events by Personal Devices," which is hereby incorporated by reference in its entirety.

BACKGROUND

Presently, electronic personal devices are both common and widely used in both private and professional contexts. A private individual may carry a smartphone, blue tooth earbuds, and a smartwatch, all communicatively connected. Law enforcement officers, in particular police officers on the front lines, carry even more personal devices. For example, a device that is more common with police officers but not common with private individuals includes a body video camera recorder designed to capture both video and audio while out on patrol or otherwise on assignment. Currently, personal devices are not integrated holistically and comprehensively. There is a need for personal devices to be communicatively connected with each other, and with software systems integrated in such a way that sensors from one device may trigger events on another personal device.

SUMMARY

Described herein are techniques for enabling a network operations center (NOC) to remotely organize personal devices of various law enforcement officers into multiple groups of devices, as well as facilitate the remote triggering one or more personal devices to perform certain actions in response to events detected by one or more other personal devices in an organized group. Law enforcement officers carry many personal devices. The idea behind the personal devices is to provide access to support from other officers and remote resources. The devices not only capture information, but also may be used to determine when other resources should be brought to bear. The canonical example is that an officer's video camera is in hibernation to save power. However, when the officer fires his or her gun, an internet of things (IoT) device sends a signal to the video camera to start recording automatically. In general, herein is described a comprehensive system to allow all personal devices for an officer, to communicate with the personal devices of other officers and with car servers and network operations centers.

In this ecosystem, law enforcement officers are communicatively connected through their personal devices not only with other officers but also with their vehicles and with a NOC that monitors the progress of officers in the field and can provide support and backup as needed. For example, the NOC may be operated by a law enforcement agency and/or a third-party service provider for the law enforcement agency. Currently, personal devices might be connected on an ad-hoc basis with different degrees of integration, and with no integration with a NOC.

In some instances, a personal device of a law enforcement officer may be a direct subscriber device to event notifications of remote triggering events detected by another personal device in an organized group. Accordingly, the subscriber device may be triggered to perform actions based on the remote triggering events. In other instances, a personal device of a law enforcement officer may be a mediating device that is configured to receive event notifications of remote trigger events from one or more first personal devices on behalf of one or more second personal devices. Accordingly, the mediating device may direct the one or more second personal devices to perform actions when the mediating device receives the notifications. In additional instances, a NOC computing device may receive an event notification of a remote triggering event from a personal device of a law enforcement officer. In turn, the NOC computing device may remotely trigger one or more personal devices to perform one or more actions based on the remote triggering event.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
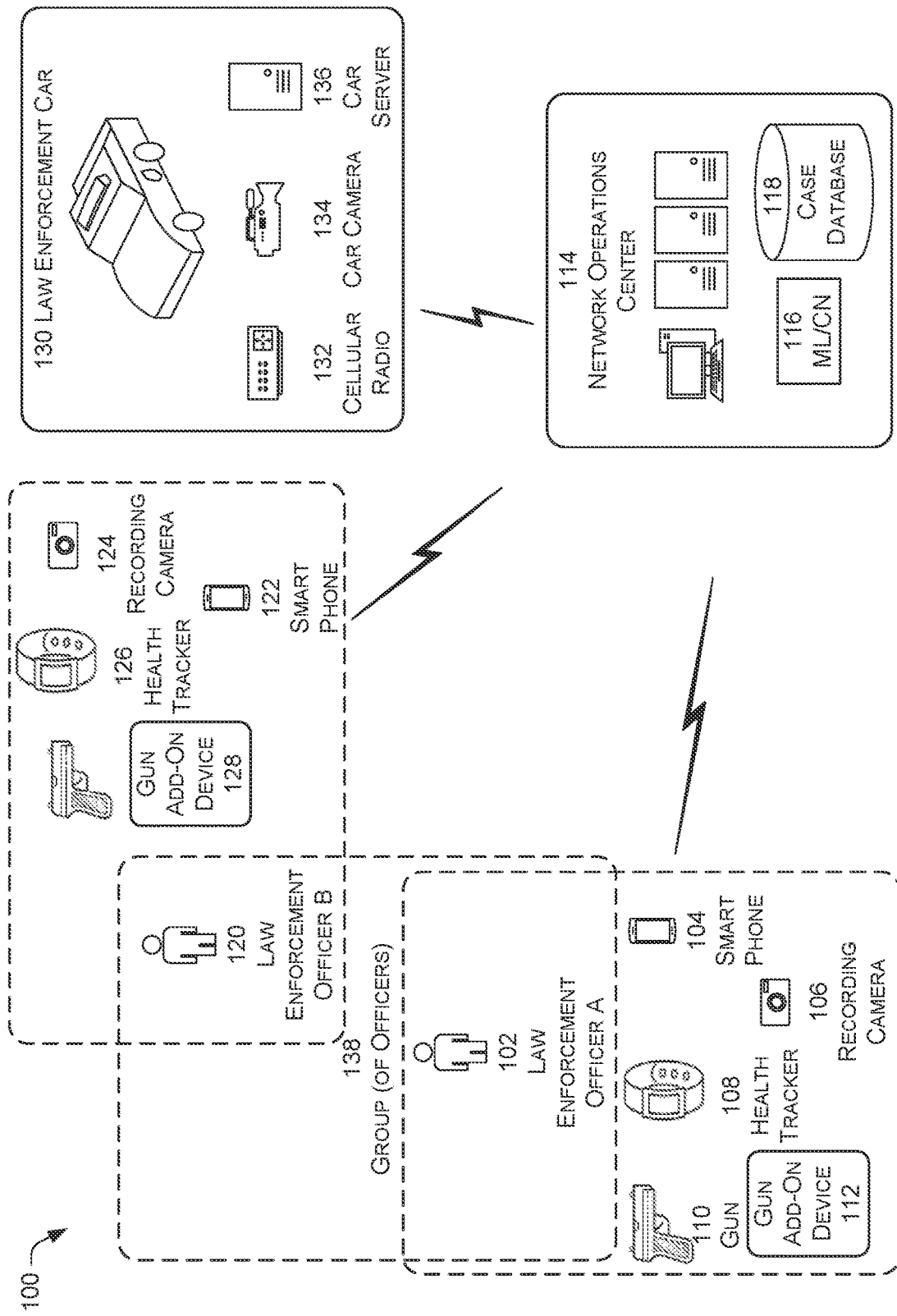
FIG. 1 illustrates an example architecture for implementing remote triggering of personal devices to perform actions in response to detected events.

This disclosure is directed to techniques for enabling a network operations center (NOC) to remotely organize personal devices of various law enforcement officers into multiple groups of devices, as well as facilitate the remote triggering one or more personal devices to perform certain actions in response to events detected by one or more other personal devices in an organized group. Law enforcement officers carry many personal devices. The idea behind the personal devices is to provide access to support from other officers and remote resources. The devices not only capture information, but also may be used to determine when other resources should be brought to bear. The canonical example is that an officer's video camera is in hibernation to save power. However, when the officer fires his or her gun, an internet of things (IoT) device sends a signal to the video camera to start recording automatically. In general, herein is described a comprehensive system to allow all personal devices for an officer, to communicate with the personal devices of other officers and with car servers and network operations centers.

In this ecosystem, law enforcement officers are communicatively connected through their personal devices not only with other officers but also with their vehicles and with a NOC that monitors the progress of officers in the field and can provide support and backup as needed. For example, the NOC may be operated by a law enforcement agency and/or a third-party service provider for the law enforcement agency. Currently, personal devices might be connected on an ad-hoc basis with different degrees of integration, and with no integration with a NOC.

In some embodiments, a subscriber device may perform a key exchange with a network operation center (NOC) computing device to receive a secret key. A list of group identifiers of personal devices for which the subscriber device is to handle events may be received at the subscriber device. The subscriber device may receive an encrypted event packet from a personal device via a direct communication connection. The subscriber device may decrypt the encrypted event packet at the subscriber device using the secret key to generate a decrypted event packet and extract a group identifier from the decrypted event packet. In response to determining that the group identifier is included in the list of group identifiers received from the NOC computing device, an event handler of a plurality of handlers stored in the subscriber device that corresponds to an event included in the decrypted event packet may be identified to handle the event.

In other embodiments, a mediating device may receive from a network operation center (NOC) computing device a list of personal devices associated with a group identifier for which mediation is to be performed by the mediating device. The mediating device may perform a key exchange with the NOC computing device to receive a secret key from the NOC computing device for decrypting event packets from a particular personal device. The mediating device may then receive an encrypted event packet from the particular personal device via a direct communication connection. The encrypted event packet is decrypted at the mediating device using the secret key to generate a decrypted event packet and a group identifier is extracted from the decrypted event packet. The event included in the decrypted event packet is then routed to an event handler of a plurality of event handlers stored in the mediating device that handles the event for the list of personal devices associated with the group identifier. Further, in response to determining via the event handler that the event triggers activity on one or more personal devices in the list of personal device, the mediating device may transmit one or more commands for handling the event via the event handler to the one or more personal devices.

In additional embodiments, a network operation center (NOC) computing device may receive an event notification for an event that includes an encrypted event packet from a personal device. The encrypted event packet may be decrypted at the NOC computing using a secret key associated with the personal device that is stored by the NOC computing device. A pattern matching may be performed via the NOC computing device at least on event data of the event included in the decrypted event packet to determine whether the event is to be handled by an event handler of the NOC. In response to determining that the event is to be handled by the event handler of the NOC, a software notification event may be sent via the NOC computer device to one or more personal devices that subscribe to an execution of the event handler of the NOC. The software notification event may prompt the one or more personal devices to perform one or more event handlers of the one or more personal devices to take one or more actions with respect to the event.

The techniques may enable the personal devices carried by an individual law enforcement officer to form a localized personal area network of devices, but also enable a NOC to configure and reconfigure virtual device groups of personal devices carried by individual or groups of law enforcement officers. The use of the NOC to facilitate event notification of remote triggering events detected by personal devices may also enable event processing at one or more NOC computing devices. Such ability to process remote trigger events at a NOC, in combination with NOC-based personal device configuration, may allow faster or more widespread response by personal devices of law enforcement officers to occurrences of events. Example implementations are provided below with reference to the following figures.

Example Overall Architecture

FIG. 1 illustrates an example architecture 100 for implementing remote triggering of personal devices to perform actions in response to detected events. A typical law enforcement officer, Officer A 102, is likely to carry a smartphone 104 capable of communications over a cellular network and a Wi-Fi network. The smartphone 104 also may also directly support, or support via add-in hardware devices, Bluetooth™, Bluetooth Low Energy™, Infrared, and other close proximity communications protocols.

Officer A 102 may also carry a personal body video camera 106 which can capture both audio and video, often from the point of view of the officer 102. In some cases, the video camera 106 is communicatively coupled to the smartphone 104. In other cases, the video camera has its own communications connection facilities over both licensed (cellular) and unlicensed (Bluetooth, Wi-Fi) wireless connections. Alternatively, the video camera 106 may have facilities to upload captured media via wired connections over connections such as Universal Serial Bus (USB).

The smartphone 104 may connect not only with video camera 106, but also with a wide range of other devices supporting unlicensed wireless connections. One example may be a health tracker such as a FitBit™ which tracks Officer A's 102 heart rate and other indicators of stress. Health trackers 108, and many other personal devices that support unlicensed spectra connections may directly and communicatively connect wirelessly with the smartphone 104.

Other devices, such as Officer A's gun 110, do not have support for communications with the smartphone 104 or other devices. In this case, add-on devices 112 can add both sensors and a communications interface for other devices. For example, an add-on device 112 includes gun sensors such as the Gun Aware™ and Holster Aware™ series of Internet-of-things (IoT) devices from Yardarm Technologies, Inc. Such sensors can detect when a gun has been unholstered, reholstered, cocked, uncocked, fired, dropped, misfired, and can transmit a corresponding wireless signal.

As previously mentioned, Officer A 102 may be in communicative contact via smartphone 104 with a network operations center (NOC) 114. Officer A 102 and other officers may be monitored at the NOC 114 by other law enforcement officers. The NOC 114 may provide information, may dispatch backup, or may provide other support for an in-field officer in real-time. Just as Officer A's 102 other personal devices 104, 106, and 108 may receive a signal from an add-on device 112, that same signal may be forwarded to the NOC 114 for processing or to trigger a response.

The received signal from the add-on device 112 may be received from other signals from other personal devices 104, 106, and 108 as well, and integrated into an overall pattern. In some cases, a machine learning or cognitive network server (ML/CN Server) 116 may interpret the incoming telemetry from the other personal devices 104, 106, and 108 and the add-on device 112 and identify a condition for when to trigger software events based on recognized patterns.

The NOC 114 also has access to third-party databases 118 such as a case database that tracks entries in live criminal cases and legal matters. Other third-party databases may include identification databases such as personnel databases and driver's license databases. These databases may be accessed to provide supplemental information in response to a triggered software event identified by the NOC 114.

Officer A 102 may be communicatively connected to another Officer B 120 via Officer B's 120 personal devices including smartphone 122, recording camera 124, health tracker 126, and gun add-on devices 128. As with Officer A 102, Officer B's 120 personal devices 122, 124, 126, and 128 may be communicatively connected to NOC 114. Officer A 102 may also be communicatively connected to his or her car 130 which may be equipped with a cellular radio 132 and a car video camera 134 and car computer server 136. These vehicular devices 132, 134, and 136 may also be communicatively connected to NOC 114.

Officer A 102, Officer B 120, Car 130, and all personal devices and on-car devices may be communicatively connected to the NOC 114. In fact, personal device and on-car device associations with a respective Officer 102, 120 or Car 130 are stored at the NOC 114. Accordingly, the NOC may virtually associate officers, cars, and/or devices into groups 138. A group 138 may be a collection of officers according to a specific criterion. The criterion may be static or semi-static, i.e. no changes between cases, such as being in the same department or unit. The criterion may be dynamic, i.e., changing over time during a case, such as being added to a group when dispatched to a case. Officers 102, 120, cars 130 and/or personal and/or on-car devices may be associated together into a group 138 managed by the NOC 114 to specify where to send a notification. In this way, a notification may be sent not only to a single officer or device, but may be broadcasted to multiple officers, cars, and/or devices as specified by a group.

Example Computing Environment

Figure 2:
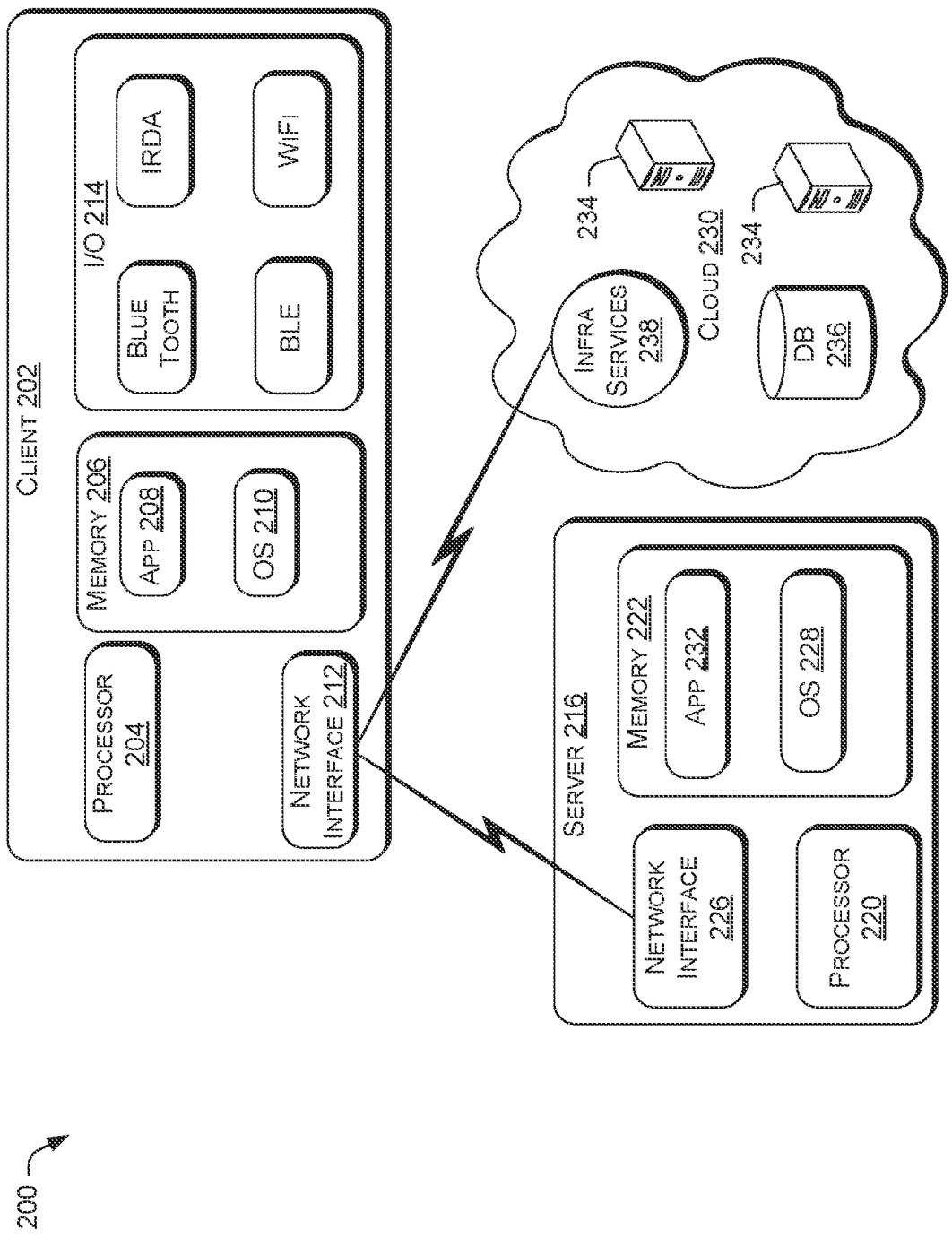
FIG. 2 is a block diagram showing various components of a computing environment for implementing the remote triggering of personal devices to perform actions in response to detected events.

FIG. 2 is a block diagram showing various components of a computing environment 200 for implementing the remote triggering of personal devices to perform actions in response to detected events. The functionality for remote triggering of events by personal devices is generally hosted on computing devices. Exemplary computing devices include without limitation on the client-side: mobile devices (including smartphones), tablet computers, laptops, and embedded systems suitable for hosting IoT sensors and add-on devices. Exemplary computing devices on the server-side include without limitation: mainframes, physical servers, and virtual machines. Generally, the computing devices are to be networked.

A client-side computing device 202, or "client" for short, may have a processor 204, and a memory 206. The processor may be a central processing unit, and/or a dedicated controller such as a microcontroller. Memory 206 is any computer-readable media that may store several software components including applications 208, an operating system 210, and/or other software components. The applications 208 may include an internet browser or application integrating internet browsing capability. In general, a software component is a set of computer-executable instructions stored together as a discrete whole. Operating system 210 and applications 208 are themselves software components or integrated aggregations of software components. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), Blu-Ray, or other optical storage, magnetic cassettes, magnetic tape, magnetic disk storage, or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. As defined herein, computer storage media does not include communication media.

The client computing device 202 may further include a network interface 212 and/or an input/output (I/O) interface 214. The network interface 212 may potentially work in concert with the I/O interface 214 and may be a network interface card supporting Ethernet and/or Wi-Fi and/or any number of other physical and/or datalink protocols. Alternatively, the network interface 212 may be an interface to a cellular radio.

The I/O interface 214 may be any controller card, such as a universal asynchronous receiver/transmitter (UART) used in conjunction with a standard I/O interface protocol such as RS-232 and/or Universal Serial Bus (USB). Client devices 202 range widely in form factors. For the smaller form factors, in particular for embedded systems and IoT devices, communications protocols supported by the network interface 212 in conjunction with the I/O interface 214 include without limitation BlueTooth™, BlueTooth Low Energy (BLE), Infrared (IRDA), and Zigbee™.

The server-side computing device 216, or "server" for short, is any computing device that may participate in a network. The network may be, without limitation, a local area network ("LAN"), a virtual private network ("VPN"), a cellular network, or the Internet. The server 216 has hardware components analogous to the client-side computing device 202. Specifically, it will include a processor 220, a memory 222, an input/output interface 224, and/or a network interface 226. In the memory 222 will be an operating system 228 and applications 232. Server hardware 216 differs from client hardware 202 in that processing power is generally more powerful to handle concurrent processes running and network capacity is greater to communicate with multiple clients 202. Server-side applications 232 may include libraries and run-times (e.g. to run interpreted code). Server-side applications 232 may include not only web servers (also called "application servers") and databases, but also server software providing functionality to coordinate between officers 102 and 120, and the NOC 114.

In general, software for remote triggering of events may be implemented as a software service on a physical server 216. However, such a software service may also be hosted on the cloud 230 via a cloud service 238. Specifically, a cloud service 238 is comprised of multiple physical computer servers which are disaggregated via a hypervisor. The physical computer servers each may have one or more processors, memory, at least I/O interface, and/or network interface. The features and variations of the processors, memory, the I/O interface, and the network interface are substantially similar to those described for the physical computer server 216 described above.

A cloud service 238 includes a hypervisor that can delegate calls to any portion of hardware in the underlying physical servers, and upon request generate a virtual machine from the separate portions of hardware, regardless of physical server (a process called "disaggregation"). Just as a physical server 216, a virtual machine may host not only software applications, components including services, but also virtual web servers 234 functionality and virtual storage/database 236 functionality.

Note that virtual machines themselves may be further partitioned into containers, which enable the execution of a program in an independent subset of the virtual machine. Software such as Kubernetes, Mesos, and Docker are examples of container management software. Unlike virtual machines which have a delay in startup due to the need for provisioning an entire OS, containers may be generated more quickly and on-demand since the underlying virtual machine is already provisioned. The cloud service 238 may embody an abstraction of services. Common examples include service abstractions such as Platform as a Service ("PAAS"), Infrastructure as a Service ("IAAS"), and Software as a Service ("SAAS"). Accordingly, the various software-based services provided by the computing environment 200 may be used to implement various aspects of the remote triggering of personal devices to perform actions in response to detected events.

In aspects related to the remote triggering of events, it is useful to consider a particular use case, testing whether a gun 110 has been fired. Recall that a gun 110 is coupled to an add-on device 112 that detects state changes of a gun, such as whether the gun has been fired or not. When a state change is detected, the add-on device 112 may be configured to transmit a software event (also known as a notification) to parties that subscribe to that software event. The transmission of the software event may include a packet of information that includes an identifier of the transmitting device (in this case gun 110) and what the software event is indicating (e.g., the gun 110 was fired, was holstered, or some other state change of interest). Additional information may also be included in the packet or an associated packet depending on the cardinality of the event transmission. Cardinality can be one-to-one in a process called "pairing." In pairing, there is only one subscribing party. Alternatively, cardinality can be one-to-many in a process called "broadcasting." In broadcasting, there are multiple subscribing parties.

The packet may include a group identifier that indicates the virtual group 138 that the gun 110 or personal device is associated with. Recall that groups may be by organization/unit or may be dynamically created based on a criterion (such as dispatched to a case). Groups may also be by devices, such as all guns for a selected set of officers, or all devices associated with one or more officers. Also, the packet may be encrypted to prevent hacking in transmission. In particular, the officer's smartphone 104 may store a key received in a key exchange with the NOC 114, and the payload of the packet may be encrypted using known cryptographic algorithms.

The state changes that trigger a software event in the first place are specific to the device being instrumented. The officers 102 and 120 have a wide range of personal devices and may be associated with a car 130 also with car-specific devices. Devices may be associated with an officer 102 or 120 in a predetermined group as to receive commands and receive software events together. Note that a device associated with Officer A 102 or Officer A 120 need not have been issued to an officer. For example, Officer A 102 may be associated not only with his or her video camera 106, but also with their partner's (Officer B 120) camera 124. In such a situation, when Officer A 102 draws his or her gun 110, add-on device 112 can broadcast packets indicating that gun 110 was drawn to trigger the recording of both his or her video camera 106 and Officer B's camera 124.

State changes for gun 110 may include that the gun was unholstered, reholstered, cocked, uncocked, fired, dropped, being reloaded, misfire, and/or so forth. Each state change may be associated with a software event. Software events that have a one-to-one correspondence with state changes are called low-level events. However, high-level events may also be defined in terms of a recognized pattern of low-level events. Specifically, a low-level software event by itself may also be combined with previous or concurrent software events by the same device or by different devices. When combined, a pattern of state changes may also be detected which in turn triggers a software event, such as a high-level software event that is a composite of other events, low-level or otherwise.

High-level software events may be composed of low-level events from multiple parties. For example, a high-level event to trigger the recording of Officer A's video camera 106 could be defined as: (1) the gun 110 was unholstered, (2) the Officer A 102 was dispatched to a high-risk case by the NOC, and (3) Officer A 102 moved out of range of his car's video camera. High-level software events may also be triggered by a pattern of past events. For example, a high-level event to trigger the recording of Officer A's video camera 106 could be defined as: (1) the gun 110 was unholstered, and (2) Officer A's health tracker 108 is showing a body temperature and heartbeat consistent with other high-stress cases where a gun was fired.

In many cases, high-level software events may be triggered by patterns identified by a machine learning/cognitive learning routine 116. Specifically, Officer A's smartphone receives low-level software events from Officer A's devices and all other devices associated with Officer A and transmits those events to the NOC 114. The machine learning/cognitive learning routine 116 has a trained model that recognizes conditions based on the low-level software events, and triggers a high-level event corresponding to the recognized condition. Note that where the machine learning/cognitive network routines 116 are performed at the NOC 114, those routines 116 will have access to the third-party databases 118 such as a case database. Accordingly, the routines 116 may have access to, what cases Officer A 102 is dispatched to, level of risk for the cases, what parties are likely to be encountered, and historical data from other cases, all of which may greatly enrich the routines 116 and its accuracy.

In aspects related to event triggering and event subscription, event triggering is the detecting of state changes by sensors or by computing devices and, based at least on some of those resulting detections, transmitting a software event. Event subscription is the reception of a software event, recognizing the software event as one that a device is subscribing to, mapping the software event to a software handler (i.e. software code to execute upon a software event), and executing the software handler. The following describes how those events may be triggered and subscribed.

1. Event Triggering

Consider a device, such as a gun 110 that itself is not networked. The device 110 may be associated with a network-aware add-on device 112. The add-on device 112 may be pre-configured to transmit a packet containing the identifier of the device and the state change detected. In some cases, the packet may be supplemented with a date/time stamp of the state change and a group identifier. The packet may also be encrypted. Accordingly, the following may occur:
  i) Add-on device 112 performs key exchange with the NOC 114 (or otherwise be associated with a key).
  ii) Associate device 110 at the NOC with a group, the group having a group identifier. The group may be a set of people or a set of devices. The group identifier is transmitted to the add-on device.
  iii) Add-on device 112 detects state change in device 110 and creates a packet corresponding to the software event including the group identifier.
  iv) Add-on device encrypts at least the payload portion of the created packed based at least on the key received during the key exchange in item (i).
  v) Transmits the packet.

2. Direct Subscription

On the receiving side of a transmitted event, there will be one or more devices that may subscribe directly to events transmitted by add-on device 112. A direct subscription is where a subscribing device, such as a smartphone 104, has sufficient network connectivity to receive a package from the add-on device 112 and execute a software event handler has indicated in the received packet. In a direct subscription, the following may occur:
  i) A subscribing device 104 may receive a key from a NOC 114 to decrypt packets received from add-on device 112.
  ii) From NOC 114, the subscribing device receives a list of group identifiers indicating groups whose events should be handled.
  iii) The subscribing device 104 may receive a packet encoding an event from add-on device 112.
  iv) Using the key in item (i) above, the subscribing device 104 decrypts the received packet.
  v) The subscribing device 104 extracts the group identifier from the decrypted packet; and if the group identifier is a group in the list of group identifiers from the NOC 113 in item (ii), identifies the relevant event handler and routes at least the packet payload to that event handler.
  vi) Subscribing device 104 performs the event handler based at least on part of the received packet payload.

Note that many devices other than smartphones 104 have the ability to directly subscribe. For example, a video camera 106 may subscribe to an event over Bluetooth or BLE. Also note, by virtue of the group identifier, multiple devices may be broadcast to, but only the devices that are in the defined group will respond to the event.

3. Device Mediation

Not all devices have sufficient communications connectivity or computing power to perform direct subscriptions. Accordingly, a mediating device such as a smartphone 104 may be used to perform the event recognition and handling. In a mediated event subscription, the following may occur:
  i) Mediating device 104 receives from the NOC 114 a list of devices to mediate event handling for.
  ii) Mediating device 104, subscribes to events on behalf of other devices using direct subscription.
  iii) At the mediating device 104, upon receiving an event, routes the event to the relevant event handler.
  iv) At the mediating device 104, in the event handler, determines whether the event is to trigger activity on devices in the list of devices from item (i).
  v) Where the event is to trigger activity on devices in the list of devices from item (i), at the mediating device 104, transmits commands to the list of devices from item (i) based at least on part of the received packet.

Use of a mediating device 104 for event handling not only enables broadcasting to many devices (note that direct subscription also enables broadcasting events), but also enables high-level events. The event handler in item (iv) not only transmits commands to devices, it also may add logic as to when and how those commands are transmitted. The event handler may also trigger other software events that upon received trigger composite high-level events.

4. NOC Mediation

In some cases, the computing power and access to third-party databases of the NOC 114 may be used to handle events. A mediating device 104 may forward low-level events, or may send a high-level event, potentially forwarding the original packet or packets encoding events to the NOC 114. The NOC may perform pattern matching, integration of third-party databases, and may transmit an event to other officers or devices, even those not proximate to the original event. In NOC mediated events, the following may occur:
  i) At a NOC 114, receive one or more event notifications.
  ii) Optionally, at a NOC 114, since an event notification received in item (i) may be a high-level event, receive the low-level event packets that triggered the high-level event.
  iii) If the received event is dependent on third-party data, perform queries on the relevant third-party database 118 to retrieve the third-party data.
  iv) Perform a pattern match of the received event notifications and where relevant the retrieved third-party data to determine if the received event notifications are to be handled by the NOC 114. The pattern match may be a machine learning or cognitive network routine.

v) Where the pattern match indicates that the events are to be handled, route at least some of the event data, packet data, and third-party data to the event handler and execute.

vi) Where a device such as a car device, officer's device, or even a NOC analyst subscribes to the execution of the event handler, send a high-level software event to the subscribing parties. The subscribing parties will perform their respective event handlers.

Note that NOC mediation covers all cardinalities of communication. The NOC 114 may receive events from one or more devices. The received events may be direct or may be mediated by a mediating device 104. The received events may be low-level, high-level or some combination. The received events may access one or more third-party databases. The event handlers may then transmit software events (notifications) to one or more other subscribing devices.

Example Processes

FIGS. 3-6 present illustrative processes 300-600 for implementing the remote triggering of personal devices to perform actions in response to detected events. Each of the processes 300-600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300-600 are described with reference to the architecture 100 of FIG. 1.

Figure 3:
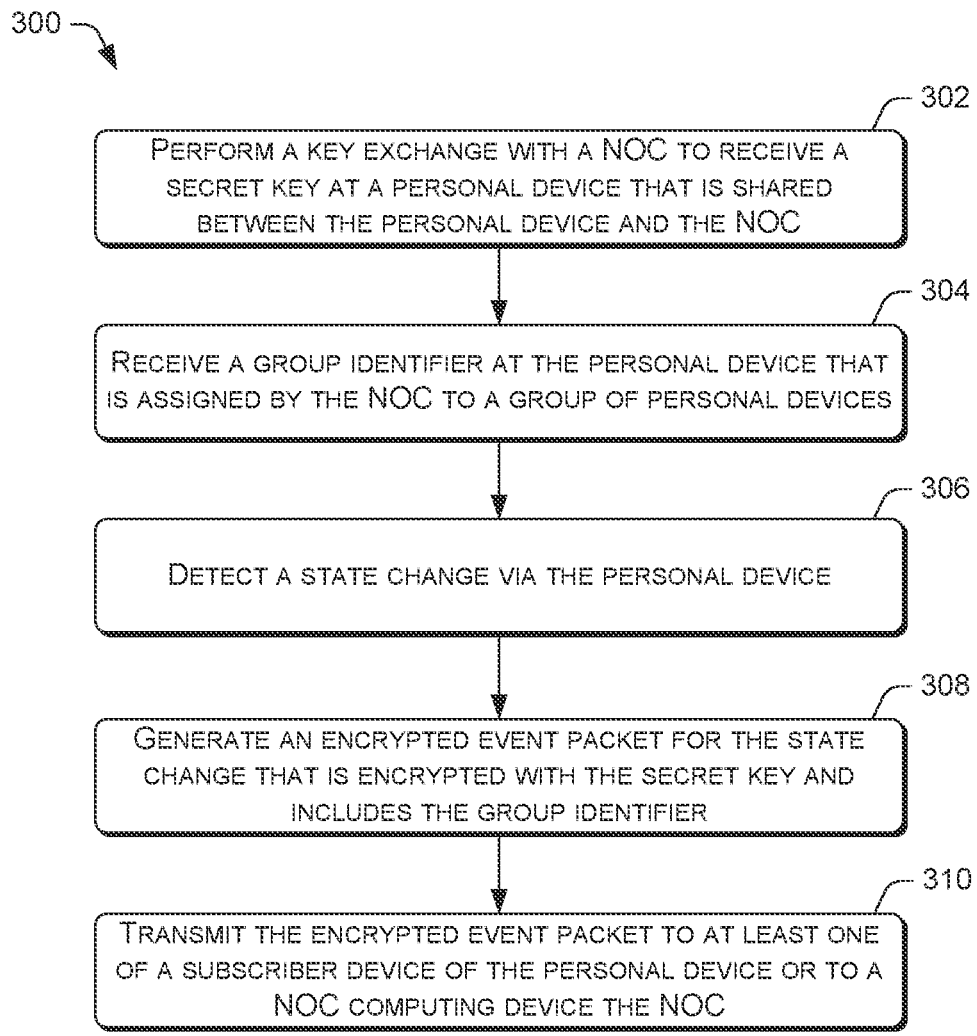
FIG. 3 is a flow diagram of an example process for a personal device to detect an occurrence of a triggering event and notify a subscriber device or a network operations center (NOC) of the triggering event.

FIG. 3 is a flow diagram of an example process 300 for a personal device to detect an occurrence of a triggering event and notify a subscriber device or a NOC of the triggering event. At block 302, a personal device may perform a key exchange with the NOC to receive a secret key that is shared between the personal device and the NOC. For example, the personal device may be a device that is carried by a law enforcement officer, a device in a law enforcement car, or an add-on device that is coupled to another device (e.g., a gun) that is carried by the law enforcement officer. In various embodiments, the key exchange may be performed with a NOC computing device of the NOC. At block 304, the personal device may receive a group identifier that is assigned by the NOC to a group of personal devices. For example, the group identifier may be assigned to the personal device by a NOC computing device based at least on a static criterion, a semi-static criterion, or a dynamic criterion.

At block 306, the personal device may detect a state change. The state change may be detected by one or more sensors of the personal device. For example, an add-on device to a gun may detect that the gun is fired, holstered, or had some other state change of interest. At block 308, the personal device may generate an encrypted event packet for the state change that is encrypted with the secret key, in which the encrypted event packet includes the group identifier. The encrypted event packet provides a notification of a software event. The encrypted event packet may further include an identifier of the transmitting device (in this case gun 110) and what the software event is indicating (e.g., the gun 110 was fired, was holstered, or some other state change of interest). At block 310, the personal device may transmit the encrypted event packet to at least one of a subscriber device of the personal device or a NOC computing device of the NOC. For example, the personal device may transmit the encrypted event packet to a subscriber device via an unlicensed wireless connection using a close proximity communication protocol or to a NOC computing device via a licensed (e.g., cellular) wireless connection.

Figure 4:
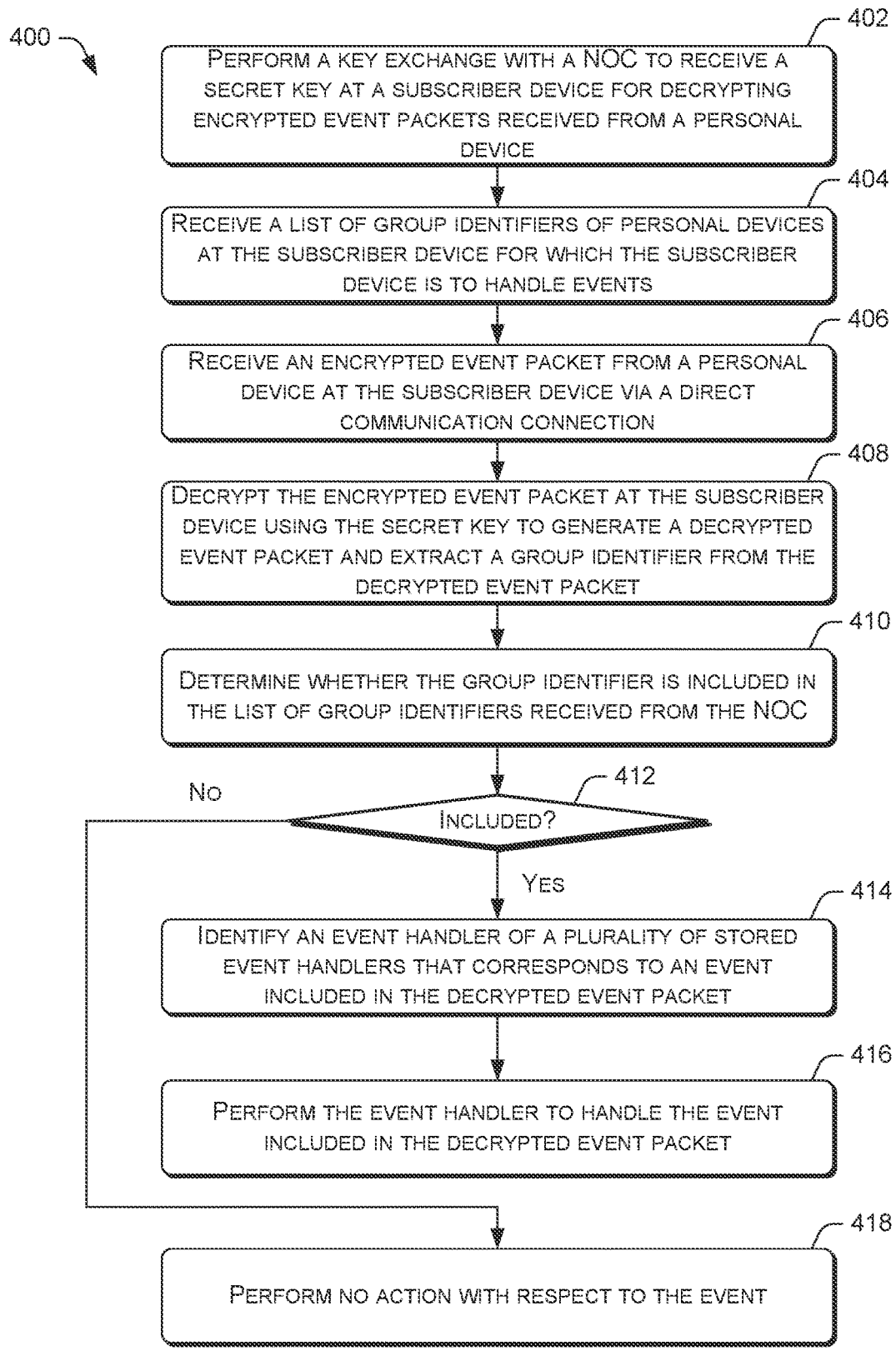
FIG. 4 is a flow diagram of an example process for a personal device that is a direct subscriber device of another personal device to perform one or more actions in response to a remote triggering event detected by the other personal device.

FIG. 4 is a flow diagram of an example process 400 for a personal device that is a direct subscriber device of another personal device to perform one or more actions in response to a remote triggering event detected by the other personal device. At block 402, a subscriber device may perform a key exchange with a NOC to receive a secret key for decrypted encrypted event packets received from a personal device. In various embodiments, the key exchange may be performed with a NOC computing device of the NOC via a licensed (e.g., cellular) wireless connection. At block 404, the subscriber device may receive a list of group identifiers of personal devices for which the subscriber device is to handle events. The list of group identifiers may be assigned to the subscriber device by a NOC computing device based at least on static criterion, a semi-static criterion, or a dynamic criterion. The person devices may include one or more devices that are carried by one or more law enforcement officers, one or more devices that are in one or more law enforcement cars, or one or more add-on devices that are coupled to one or more other devices that are carried by the one or more law enforcement officers. The subscriber device may be a personal device that is carried by a law enforcement officer, a device in a law enforcement car, or an add-on device that is coupled to another device that is carried by the law enforcement officer.

At block 406, the subscriber device may receive an encrypted event packet from a personal device via a direct communication connection. For example, the subscriber device may receive the encrypted event packet via an unlicensed wireless connection using a close proximity communication protocol. At block 408, the subscriber device may decrypt the encrypted event packet using the secret key to generate a decrypted event packet and extract a group identifier from the decrypted event packet.

At block 410, the subscriber device may determine whether the group identifier is included in the list of group identifiers received from the NOC. At decision block 412, if the subscriber device determines that the group identifier is included in the list of group identifiers ("yes" at decision block 412), the process 400 may proceed to block 414. At block 414, the subscriber device may identify an event handler of a plurality of stored event handlers that corresponds to an event included in the decrypted event packet. In some embodiments, the event may be a low-level software event or a high-level software event that is comprised of multiple low-level software events. Each software event may further include one or more previous and/or concurrent software events.

At block 416, the subscriber device may perform the event handler to handle the event included in the decrypted event packet. For example, the event handler may trigger video recording by the subscriber device in response to an event in which a gun of the law enforcement officer is detected as being unholstered by a gun add-on device. Returning to decision block 412, if the subscriber device determines that the group identifier from the decrypted event packet is not included in the list of identifiers ("no" at decision block 412), the process 400 may proceed to block 418. At block 418, the subscriber device may perform no action with respect to the event. In this way, the NOC may use the list of group identifiers to control the subscriber device so that the subscriber device only responds to events that originated from specific personal devices, even though the subscriber device may subscribe to events from other personal devices.

Figure 5:
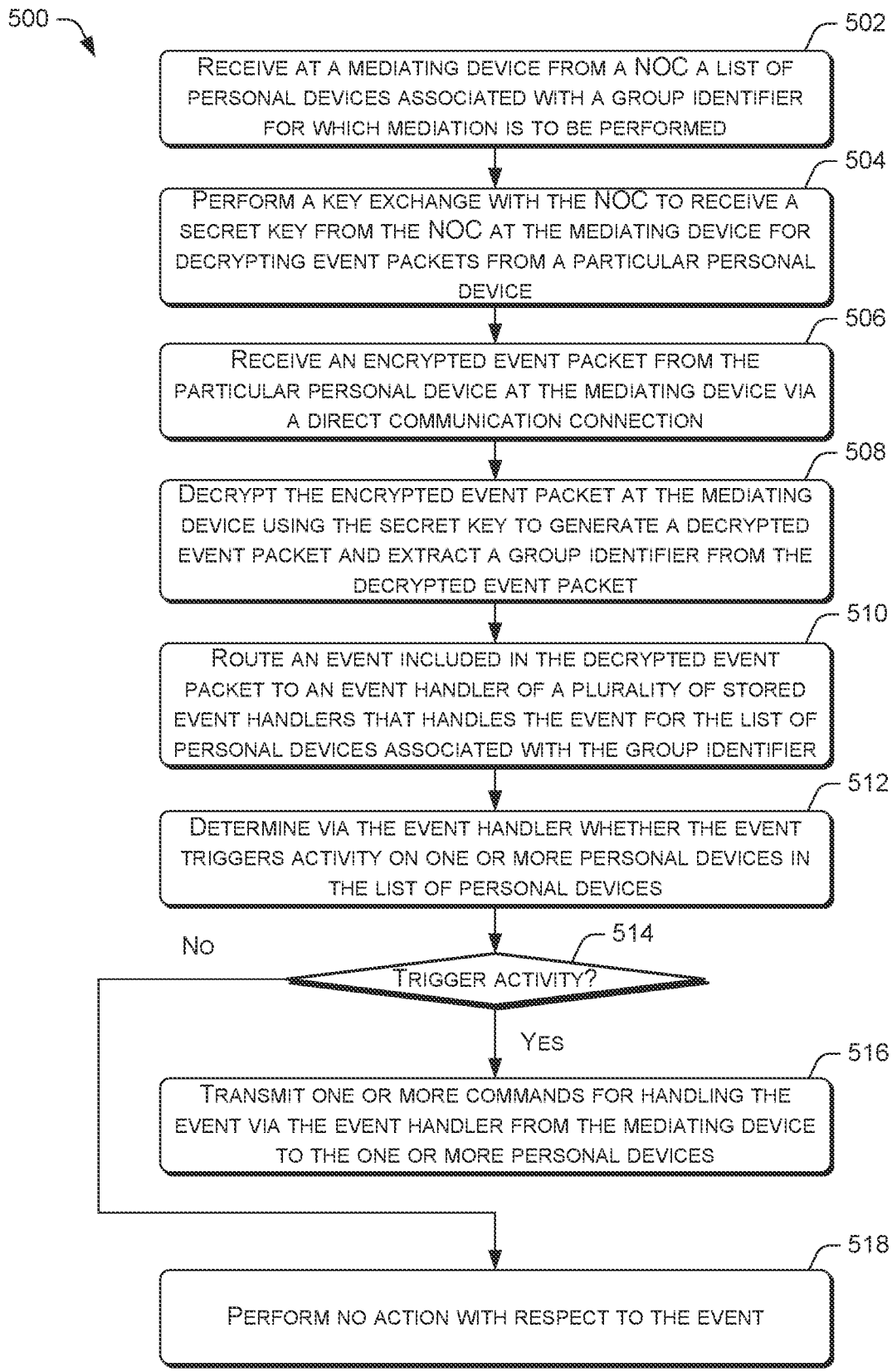
FIG. 5 is a flow diagram of an example process for a personal device that is a mediating device to trigger one or more personal devices to perform one or more actions in response to a remote triggering event detected by another personal device.

FIG. 5 is a flow diagram of an example process 500 for a personal device that is a mediating device to trigger one or more personal devices to perform one or more actions in response to a remote triggering event detected by another personal device. At block 502, the mediating device may receive from a NOC a list of personal devices associated with a group identifier for which mediation is to be performed. The mediating device may be a personal device that is carried by a law enforcement officer, a device in a law enforcement car, or an add-on device that is coupled to another device that is carried by the law enforcement officer. At block 504, the mediating device may perform a key exchange with the NOC to receive a secret key from the NOC for decrypting event packets from a particular personal device. In various embodiments, the key exchange may be performed with a NOC computing device of the NOC via a licensed (e.g., cellular) wireless connection.

At block 506, the mediating device may receive an encrypted event packet from the particular device via a direct communication connection. For example, the mediating device may receive the encrypted event packet via an unlicensed wireless connection using a close proximity communication protocol. At block 508, the mediating device may decrypt the encrypted event packet at the mediating device using the secret key to generate a decrypted event packet and extract a group identifier from the decrypted event packet. At block 510, the mediating device may route an event included in the decrypted event packet to an event handler of a plurality of stored event handlers that handles the event for the list of personal devices associated with the group identifier. In some embodiments, the event may be a high-level software event that is comprised of multiple low-level software events. Each software event may further include one or more previous and/or concurrent software events.

At block 512, the mediating device may determine via the event handler whether the event triggers activity on one or more personal devices in the list of personal devices. At decision block 514, if the event is determined to trigger activity on the one or more personal devices ("yes" at decision block 514), the process 500 may proceed to block 516. At block 516, the mediating device may transmit one or more commands for handling the event via the event handler to the one or more personal devices. In some embodiments, the event handler may not only transmit the commands, but may also include a logic that controls when and how these commands are transmitted. For example, the command may be for a personal device to start video recording in response to an event in which a gun of the law enforcement officer is detected as being unholstered by a gun add-on device and the law enforcement officer has a body temperature and heartbeat consistent with other high-stress cases where a gun was fired.

Returning to decision block 514, if the event is determined to not trigger activity on the one or more personal devices ("no" at decision block 514), the process 500 may proceed to block 518. At block 518, the mediating device may perform no action with respect to the event.

Figure 6:
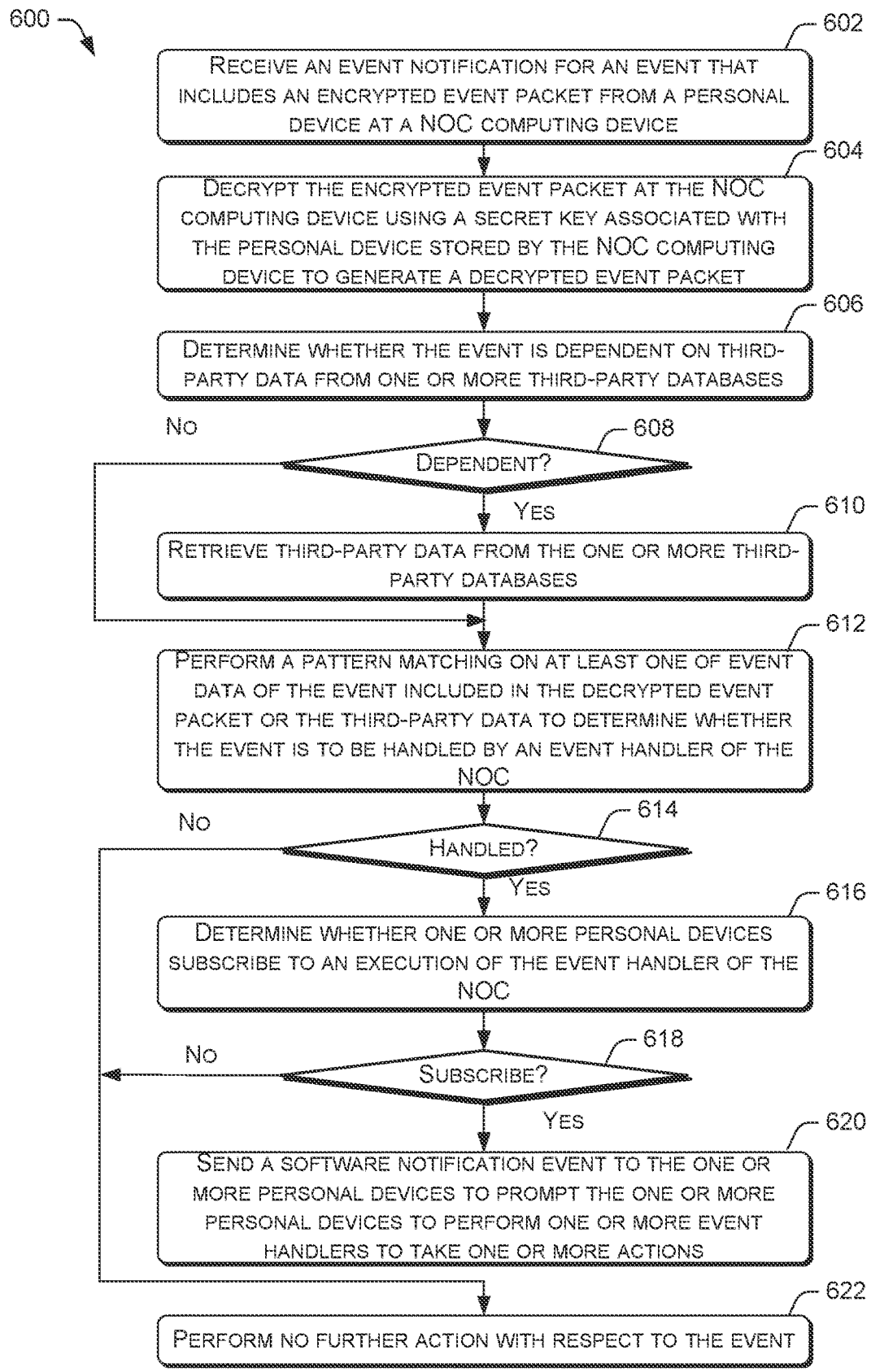
FIG. 6 is a flow diagram of an example process for a NOC computing device to receive an event notification of a remote triggering event from a personal device and remotely trigger one or more personal devices to perform one or more actions based on the remote triggering event.

FIG. 6 is a flow diagram of an example process 600 for a NOC computing device to receive an event notification of a remote triggering event from a personal device and remotely trigger one or more personal devices to perform one or more actions based on the remote triggering event. At block 602, a NOC computing device may receive an event notification for an event that includes an encrypted event packet from a personal device. The personal device may be a device that is carried by a law enforcement officer, a device in a law enforcement car, or an add-on device that is coupled to another device that is carried by the law enforcement officer. In The event may be a low-level software event or a high-level software event that is comprised of multiple low-level software events. Each software event may further include one or more previous and/or concurrent software events.

At block 604, the NOC computing device may decrypt the encrypted event packet at the NOC computing device using a secret key associated with the personal device that is stored by the NOC computing device to generate a decrypted event packet. At block 606, the NOC computing device may determine whether the event included in the decrypted event packet is dependent on third-party data from one or more third-party databases, i.e., such databases may provide supplemental information that are related to the event. For example, the third-party databases may include a case database that tracks entries in live criminal cases and legal matters, identification databases such as personnel database and driver's license databases. At decision block 608, if the NOC computing device determines that the event is dependent on third-party data ("yes" at decision block 608), the process 600 may proceed to block 610. At block 610, the NOC computing device may retrieve third-party data from the one or more third-party databases. However, if the NOC computing devices determine that the event is not dependent on third-party data ("no" at decision block 608) the process 600 may proceed directly to block 612.

At block 612, the NOC computing device may perform a pattern matching on at least one of the event data of the event included in the decrypted event packet or the third-party data to determine whether the event is to be handled by an event handler of the NOC. For example, the pattern match may be performed via a machine learning or cognitive network routine. At decision block 614, if it is determined that the event is to be handled by the event handler of the NOC ("yes" at decision block 614), the process 600 may proceed to block 616. At 616, the NOC computing device may determine whether one or more personal devices subscribe to an execution of the event handler of the NOC. At decision block 618, if there are one or more personal devices that subscribe to the execution of the event handler ("yes" at decision block 618), the process 600 may proceed to block 620. At block 620, the NOC computing device may send a software notification event to the one or more personal devices to prompt the one or more personal devices to perform one or more respective event handlers of the one or more personal devices to take one or more actions with respect to the event. For example, the software notification event may be a high-level software event that trigger a personal device to perform one or more actions using its own event handler.

Returning to decision block 614, if it is determined that the event is not to be handled by the event handler of the NOC ("no" at decision block 614), the process 600 may proceed to block 622. At block 622, the NOC computing device may perform no further action with respect to the event. Returning to decision block 618, if there are no personal devices that subscribe to the execution of the event handler ("no" at decision block 618), the process 600 may also proceed to block 622.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
performing, via a subscriber device, a key exchange with a network operation center (NOC) computing device to receive a secret key at the subscriber device;
receiving, from the NOC computing device, a list of device group identifiers associated with a plurality of devices at the subscriber device;
receiving an encrypted event packet from a personal device at the subscriber device via a communication connection, wherein the encrypted event packet includes a first group identifier and an event, and wherein the first group identifier is associated with the personal device;
decrypting the encrypted event packet at the subscriber device using the secret key to generate a decrypted event packet that includes the first group identifier and the event;
extracting, at the subscriber device, the first group identifier from the decrypted event packet;
determining, at the subscriber device, whether the extracted first group identifier is included in the list of device group identifiers received from the NOC computing device;
in response to determining that the extracted first group identifier is included in the list of device group identifiers received from the NOC computing device, identifying, at the subscriber device, an event handler of a plurality of handlers stored in the subscriber device as a corresponding event handler that corresponds to the event included in the decrypted event packet; and
in response to determining that the extracted first group identifier is not included in the list of device group identifiers received from the NOC computing device, performing no action at the subscriber device on the event included in the decrypted event packet.

2. The method of claim 1, further comprising executing the corresponding event handler to handle the event included in the decrypted event packet.

3. The method of claim 1, wherein the list of device group identifiers is assigned by the NOC computing device to the subscriber device based at least on a static criterion, a semi-static criterion, or a dynamic criterion.

4. The method of claim 1, wherein the performing the key exchange includes performing the key exchange with the NOC computing device via a wireless connection, and wherein the communication connection is implemented using an unlicensed wireless connection.

5. The method of claim 1, wherein the plurality of devices include one or more devices that are carried by one or more law enforcement officers, one or more additional devices that are in one or more law enforcement vehicles, or one or more add-on devices that are coupled to one or more other devices that are carried by the one or more law enforcement officers.

6. The method of claim 1, wherein the event includes a first-level software event that corresponds to a state change detected by the personal device or a second-level software event that comprises one or more first-level software events.

7. The method of claim 1, wherein the receiving the encrypted event packet includes receiving the encrypted event packet following a detection of a state change by the personal device, and wherein the encrypted event packet is generated by the personal device via an additional secret key that the personal device obtained from the NOC computing device via an additional key exchange.

8. One or more non-transitory computer-readable media storing computer-executable instructions that, upon execution, cause one or more processors to perform acts comprising:
performing a key exchange with a network operation center (NOC) computing device to receive a secret key;
receiving, from the NOC computing device, a list of device group identifiers associated with a plurality of devices;
receiving an encrypted event packet from a personal device via a communication connection, wherein the encrypted event packet includes a first group identifier and an event, and wherein the first group identifier is associated with the personal device;
decrypting the encrypted event packet using the secret key to generate a decrypted event packet that includes the first group identifier and the event;
extracting the first group identifier from the decrypted event packet;
determining whether the extracted first group identifier is included in the list of device group identifiers received from the NOC computing device;
in response to determining that the extracted first group identifier is included in the list of device group identifiers received from the NOC computing device, identifying an event handler of a plurality of handlers as a corresponding event handler that corresponds to the event included in the decrypted event packet; and
in response to determining that the extracted first group identifier is not included in the list of device group identifiers received from the NOC computing device, performing no action on the event included in the decrypted event packet.

9. The one or more non-transitory computer-readable media of claim 8, wherein the acts further comprise executing the corresponding event handler to handle the event included in the decrypted event packet.

10. The one or more non-transitory computer-readable media of claim 8, wherein the list of device group identifiers is assigned by the NOC computing device based at least on a static criterion, a semi-static criterion, or a dynamic criterion.

11. The one or more non-transitory computer-readable media of claim 8, wherein the performing the key exchange includes performing the key exchange with the NOC computing device via a wireless connection, and wherein the communication connection is implemented using an unlicensed wireless connection.

12. The one or more non-transitory computer-readable media of claim 8, wherein the event includes a first-level software event that corresponds to a state change detected by the personal device or a second-level software event that comprises one or more first-level software events.

13. The one or more non-transitory computer-readable media of claim 8, wherein the receiving the encrypted event packet includes receiving the encrypted event packet following a detection of a state change by the personal device, and wherein the encrypted event packet is generated by the personal device via an additional secret key that the personal device obtained from the NOC computing device via an additional key exchange.

14. A subscriber computing device comprising:
one or more processors; and
a memory including instructions that, when executed by the one or more processors, cause the subscriber computing device to at least:
perform a key exchange with a network operation center (NOC) computing device to receive a secret key;
receive, from the NOC computing device, a list of device group identifiers associated with a plurality of devices;
receive an encrypted event packet from a personal device via a communication connection, wherein the encrypted event packet includes a first group identifier and an event, and wherein the first group identifier is associated with the personal device;
decrypt the encrypted event packet using the secret key to generate a decrypted event packet that includes the first group identifier and the event;
extract the first group identifier from the decrypted event packet;
determine whether the extracted first group identifier is included in the list of device group identifiers received from the NOC computing device;
in response to determining that the extracted first group identifier is included in the list of device group identifiers received from the NOC computing device, identify an event handler of a plurality of handlers as a corresponding event handler that corresponds to the event included in the decrypted event packet; and
in response to determining that the extracted first group identifier is not included in the list of device group identifiers received from the NOC computing device, perform no action on the event encoded in the decrypted event packet.

15. The subscriber computing device of claim 14, wherein the instructions when executed by the one or more processors, further cause the subscriber computing device to execute the corresponding event handler to handle the event included in the decrypted event packet.

16. The subscriber computing device of claim 14, wherein causing the subscriber computing device to perform the key exchange includes causing the subscriber computing device to perform the key exchange with the NOC computing device via a wireless connection, and wherein the communication connection is implemented using an unlicensed wireless connection.

17. The subscriber computing device of claim 14, wherein the event includes a first-level software event that corresponds to a state change detected by the personal device or a second-level software event that comprises one or more first-level software events.

18. The subscriber computing device of claim 14, wherein causing the subscriber computing device to receive the encrypted event packet includes causing the subscriber computing device to receive the encrypted event packet following a detection of a state change by the personal device, and wherein the encrypted event packet is generated by the personal device via an additional secret key that the personal device obtained from the NOC computing device via an additional key exchange.

* * * * *